United States Patent [19]

Carney

[11] Patent Number: 5,222,249
[45] Date of Patent: Jun. 22, 1993

[54] DYNAMIC RF COMMUNICATION RESOURCE ACCESS BY ROVING MOBILE UNITS

[75] Inventor: Scott N. Carney, Palatine, Ill.

[73] Assignee: Motorola, Inc., Schaumburg, Ill.

[21] Appl. No.: 610,604

[22] Filed: Nov. 8, 1990

[51] Int. Cl.⁵ .............................................. H04B 7/26
[52] U.S. Cl. ..................... 455/33.2; 455/34.1; 455/54.1; 455/56.1
[58] Field of Search ............... 455/33, 34, 53, 54, 455/56, 33.1, 33.2, 33.4, 34.1, 34.2, 53.1, 54.1, 54.2, 56.1; 379/59, 60, 63

[56] References Cited

U.S. PATENT DOCUMENTS

| | | | |
|---|---|---|---|
| 4,670,899 | 6/1987 | Brody et al. | 379/60 |
| 4,856,048 | 8/1989 | Yamamoto et al. | 379/60 |
| 4,975,939 | 12/1990 | Sasaki | 379/60 |
| 5,034,993 | 7/1991 | Sasuta et al. | 455/34 |

Primary Examiner—Reinhard J. Eisenzopf
Assistant Examiner—Chi H. Pham
Attorney, Agent, or Firm—Darleen J. Stockley

[57] ABSTRACT

A method and system are set forth for providing dynamic RF communication resources to a mobile unit as that mobile unit changes geographic areas such that RF communication resource use by that mobile unit is generally not forcibly terminated as that mobile unit roves to a geographical area not served by the RF communication resource where the mobile unit is presently located.

26 Claims, 3 Drawing Sheets

1

DYNAMIC RF COMMUNICATION RESOURCE ACCESS BY ROVING MOBILE UNITS

FIELD OF THE INVENTION

This invention relates in general to RF communication resource assignment for roving mobile units, and more particularly to dynamic modification of RF communication resource assignment for roving mobile units.

BACKGROUND OF THE INVENTION

Roving mobile units utilizing cellular mobile communication systems are known. Typically, a mobile unit is provided with a communication resource, generally an RF (radio frequency) channel, that is usable for at least a first base site covering a geographical area. During periods of high RF communication system use, as the mobile unit roves to at least a second base site geographical area, the mobile unit may be denied continued assignment to a communication resource in the second base site geographical area, forcing termination of communication resource use by the mobile unit. Forced termination is a more severe problem than simply denial of initial assignment to an RF communication resource, and hence is highly undesirable. There is a need for a RF communication system that provides a next RF communication resource to a mobile unit that utilizes a first RF communication resource and roves from a first geographical base site area to another geographical base site area not served by the first RF communication resource.

SUMMARY OF THE INVENTION

A method and system are set forth for more efficiently providing RF communication resources for at least a first mobile unit based on at least one of: dynamic needs and anticipated dynamic needs of the at least first mobile unit, comprising at least: at least a first central processor's obtaining at least first route information of at least a first mobile unit; the at least first central processor's utilizing the route information of the at least first mobile unit to determine at least one of: dynamic and anticipated dynamic RF communication resource needs of the at least first mobile unit; and the at least first central processor's dynamically providing at least a first RF communication resource, where available, for the at least first mobile unit in correspondence with dynamic RF communication resource availability and at least one of: the dynamic and the anticipated dynamic mobile unit RF communication resource need determination.

DETAILED DESCRIPTION OF THE DRAWINGS

Figure 1:
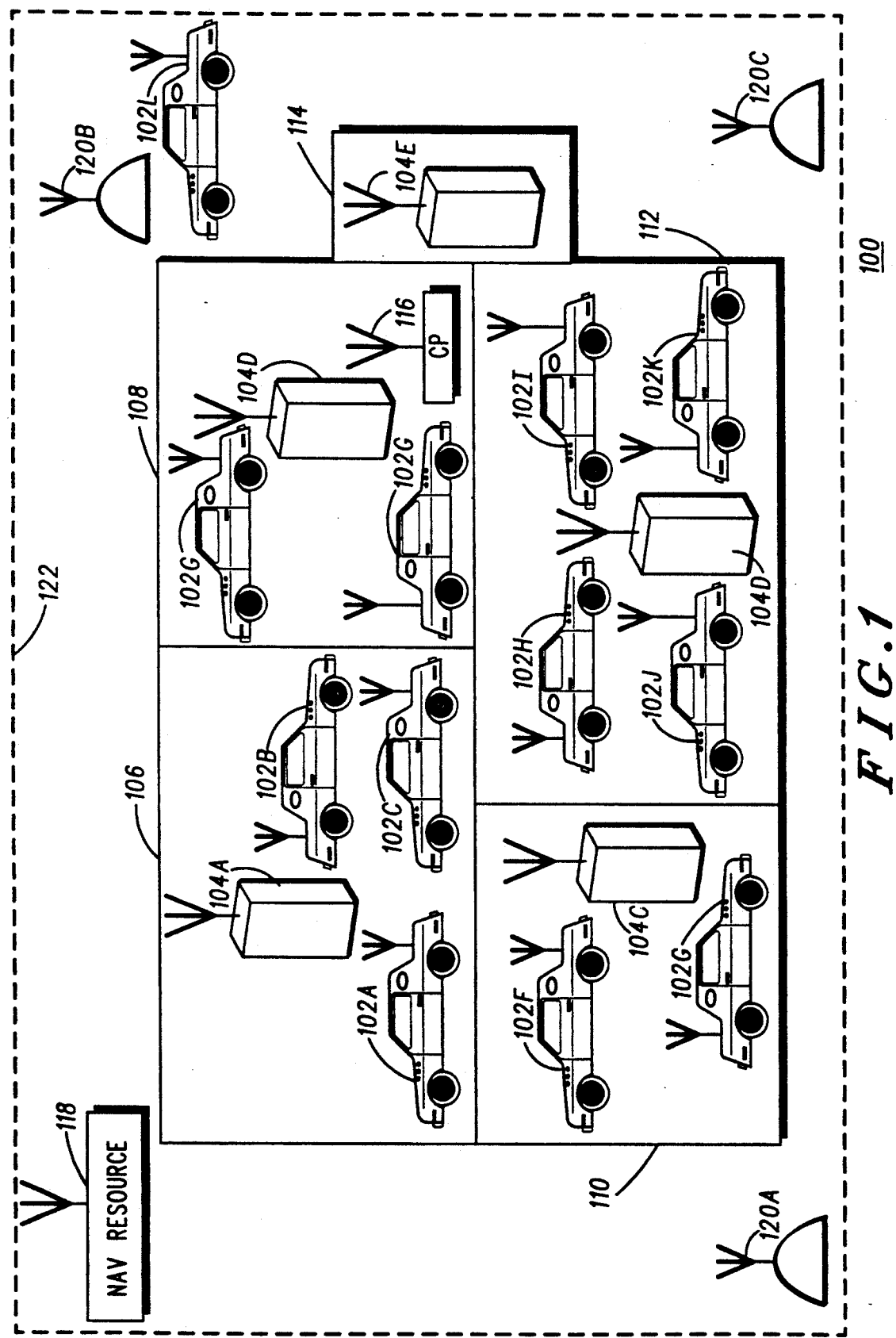
FIG. 1 illustrates one geographical layout of mobile units utilizing the present invention.

FIG. 1, numeral 100, illustrates one geographical layout of mobile units utilizing the present invention in an RF communication system, setting forth at least a first external navigation resource (118) and at least a first external information source (120A, 120B, 120C, ...) as external location information devices. Mobile units (102 A-L, ...) are depicted together with certain route information links (104A-E, ...), typically base sites, having geographical areas (106, 108, 110, 112, 114, ...) associated with the enclosed route information links (104A-E, ...) are set forth. Route information typically includes at least information of a specific mobile unit location, and if selected, includes further route information. Base sites typically serve as route information links, in addition to providing conventional cellular communication. Route information links may also be independent of a cellular network. For example, the at least first external navigation resource (118), as well as the at least first mobile unit (102A-L, ...) may utilize other communication links such as RF communication to link with an at least first central processor (116).

The at least first central processor (116) controls RF communication allocation resources, and, in the present invention, reserves at least a first RF communication resource to provide the at least first RF communication resource, where available, for an at least first mobile unit in correspondence with dynamic RF communication resource availability and at least one of: the dynamic and the anticipated dynamic mobile unit RF communication resource need determination. The at least first central processor (116) typically employs one of: utilizing at least the first route information, and where selected, the at least partial dynamic route information (dynamic route information is substantially information relating to a mobile unit's changing location), to estimate an anticipated dynamic route for the at least first mobile unit; utilizing at least the first route information provided by the external navigational resource, and where selected, the at least partial dynamic route information, to determine a first dynamic route for the at least first mobile unit; and utilizing at least the first route information determined by the at least first mobile unit utilizing an at least first external information source, and where selected, the at least partial dynamic route information, to determine a second dynamic route for the at least first mobile unit, where that dynamic route information is provided by the at least first mobile unit; such that the RF communication resource needs of the at least first mobile unit are determined in view of at least one of: that mobile unit's anticipated dynamic route, first dynamic route, and second dynamic route. The anticipated, first, and second dynamic routes may be the same.

The ALF external information source (120A-C, ...) may be a LORAN C, a global positioning system, and the like, and will have certain selected geographical boundaries (here shown as 122). The ALF external information source boundaries need not be the same as geographical boundaries for base site route information links (106, 108, 110, 112, 114, ...). It is clear that any desired number, reasonable to a particular environment, of mobile units and route information links may be utilized. Typically, the route information links (104A-E, ...) transceive across selected associated mobile unit areas comprising geographical areas (106-114, ...).

Typically, each base site providing a route information link (104A-E, ...) is associated with at least one particular geographical area (106-114, respectively). The at least first (ALF) central processor (CP) (116) transceives information by RF channel communication, point-to-point landline communication, fiber optics, or the like. Certain mobile units (102L, ...) may be outside a geographical area encompassing an RF system utilizing the present invention.

Figure 2:
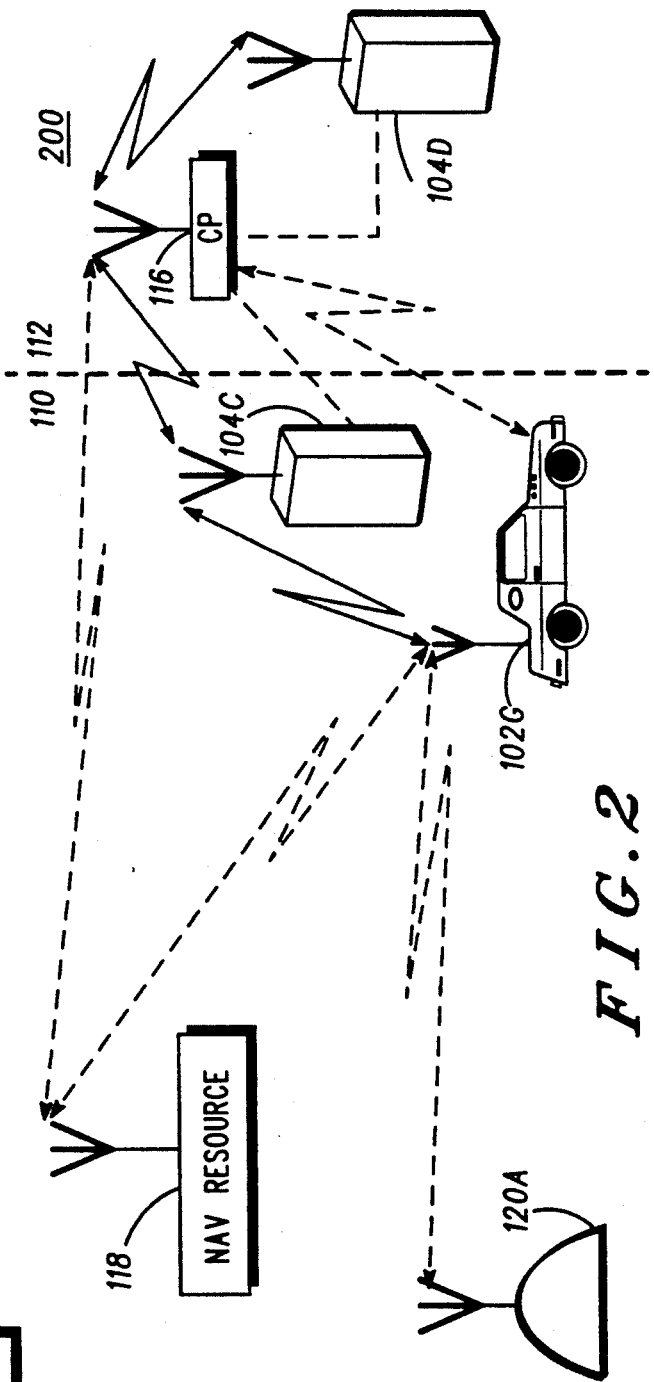
FIG. 2 illustrates one implementation of the present invention by a single mobile unit.

FIG. 2, numeral 200, illustrates one implementation of the present invention by a single mobile unit, setting forth more particularly communications utilized by the present invention. A roving mobile unit (102G) utilizes at least one of: onboard location information; at least a first (ALF) external information (INFO) source; and an external navigation (NAV) resource; to determine at least first route information for that mobile unit. The at least first mobile unit transmits the at least first route information to the at least first central processor (CP) (116), typically utilizing at least a first route information link (104C). Where the at least first route information is determined by at least a first external information source, where desired, that information may alternatively be transmitted or sent by landline from the NAV resource to the CP (116). The CP determines one of: an anticipated dynamic route and at least a first dynamic route of that mobile unit by one of: estimation of an anticipated dynamic path in correlation with dynamic route information provided by the mobile unit (102); first dynamic route determination based on information supplied by the NAV resource (118); and second dynamic route determination based on information supplied by that mobile unit (102G) as to that mobile unit's dynamic route plan. The CP (116) utilizes at least the first route information and, where selected, the further information cited above, in view of dynamic RF communication resources available, to provide at least a first, where available, dynamic RF communication resource for the at least first mobile unit (102G) to continue an RF communication in progress, as it leaves one geographical area (here, for example, 110) and enters another geographical area (112) served by other RF communication resources. Dynamic RF communication resources are defined to be selected voice and or data channels set aside by the CP for allocation to geographical areas as needed to provide for continuing RF communication for mobile units leaving one geographical area served by a first base site route information link (104C, ...) and entering another geographical area served by a second base site route information link (104D, ...).

Figure 3:
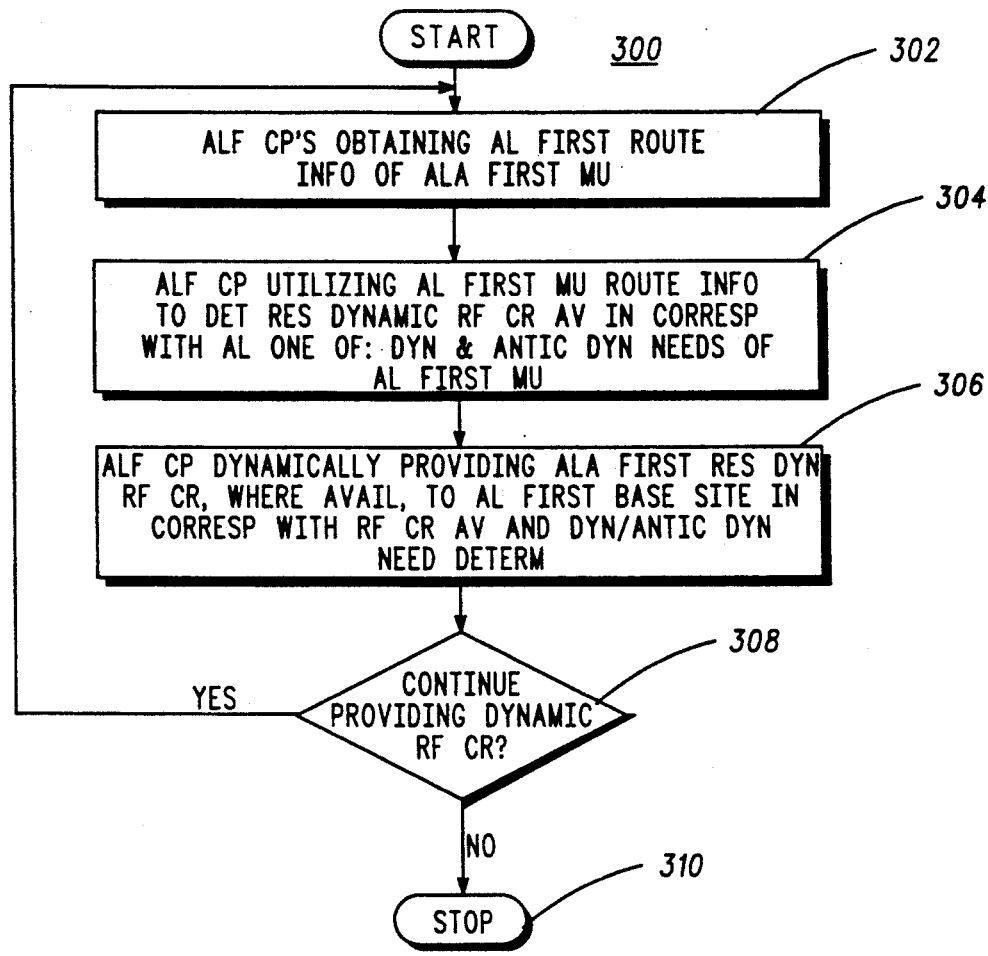
FIG. 3 is a flow diagram in accordance with the method of the present invention.

FIG. 3, numeral 300, is a flow diagram setting forth one implementation of the method of the present invention. The method of the present invention allows efficient provision of RF communication resources, typically comprising at least a first user-traffic voice and/or data channel allocated for continuation of mobile unit communications as a mobile unit changes geographic base site areas, for that mobile unit on a basis of at least one of: dynamic needs and anticipated dynamic needs of at least a first mobile unit. Typically a number of at least first user-traffic and/or data channels provided to mobile units within a geographical area may be variable, as determined by an at least first central processor on a basis of dynamic needs and anticipated dynamic needs of the at least first mobile unit. Dynamic needs are RF communication resource needs that are affected by movement of at least a first mobile unit. Anticipated dynamic needs are projected RF communication resource needs based on projected movement of at least a first mobile unit. Communication resource needs may be based on call duration information determined from user request or statistical data and on mobile unit location change.

The method utilizes at least a step of at least a first central processor (CP) obtaining at least first route information (INFO) of at least a (ALA) first mobile unit (MU)(302). Typically, the at least first (ALF) CP then updates the CP route information for the at least (AL) first MU. It is clear that a substantial number of MUs may utilize the method of the present invention substantially simultaneously.

FIG. 3, numeral 300, is a flow diagram illustrating one implementation of a central processor's obtaining at least first route information of ALA first MU (302) in accordance with the present invention. Where ALA first MU is to provide at least route information (302), the AL first MU transmits at least that MU's route information, and may further provide that MU's at least partial route information to the ALF CP (304) The AL first MU may utilize known present route information, and may also, if desired, utilize information such as a map downloaded from a ROM, a map transmitted to the MU, LORAN C, and the like. Where the AL first MU is not to provide at least route information (302), ALA first navigation resource (118) external to the at least first MU transmits AL the first MU's route information to the ALF CP (306).

Upon the ALF CP's obtaining AL first route information of ALA first MU (302), the ALF CP utilizes AL the first MU route information (INFO) to determine (DET) dynamic RF communication resource availability (CR AV) in correspondence with at least (AL) one of: dynamic (DYN) and anticipated dynamic (ANTIC DYN) needs of the AL first MU (304). The ALF CP then dynamically provides at least a (ALA) first reserved (RES) RF communication resource (CR), where available (AVAIL), to an at least (AL) first base site in correspondence with RF CR availability (AV) and a dynamic and anticipated at least first mobile unit need determination (DETERM)(306). For example, in anticipation that the ALF MU is leaving or is about to leave a first geographical base site area and to enter a second geographical base site area, the ALF CP may provide or reserve an RF communication resource for the ALF MU in the second geographical base site area.

Clearly, the ALF CP may dynamically anticipate the AL first MU's dynamic needs in more than one way. For example, the ALF external information source (ALF EXTERNAL INFO SOURCE)(510) may provide the AL first MU's route by simply providing at least two route information determinations for the AL first MU, and, the ALF CP may statistically analyze at least two route information determinations to determine the AL first MU's route and direction, thereby anticipating dynamic RF communication resource needs of that MU. Also, the ALF CP may have a preplanned route for the AL first MU and may utilize as few as one at least first mobile unit route information determination to anticipate dynamic RF communication resource needs of that MU.

Upon determining to continue to provide a dynamic RF CR (308), the CP recycles to the step of the ALF CP's obtaining at least first route information of the ALF MU (302). Upon determining not to continue to provide a dynamic RF CR (308), the provision of the at least first dynamic RF CR is terminated (310).

Figure 4:
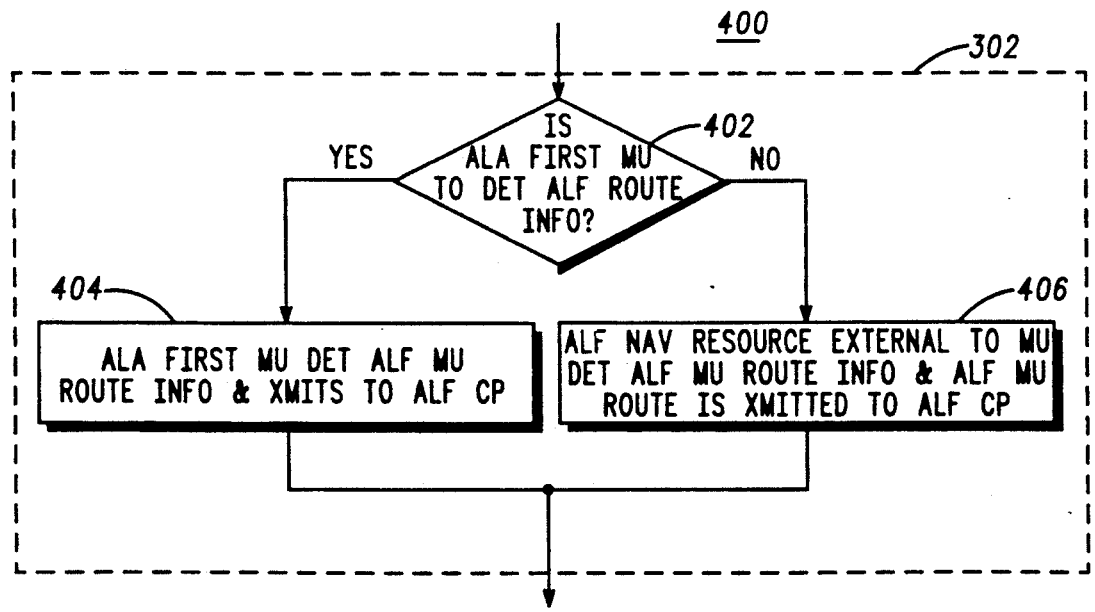
FIG. 4 is a flow diagram illustrating one implementation of a central processor's obtaining at least first route information of at least a first mobile unit in accordance with the present invention.

FIG. 4, numeral 400, is a flow diagram illustrating one implementation of a central processor's obtaining at least first route information of at least a first mobile unit in accordance with the present invention. Upon determining that the ALA first mobile unit is to provide the at least first route information (402), the at least first mobile unit obtains and proceeds to provide the at least first route information to the CP (404). Upon determining that the ALA first mobile unit is not to provide the at least first route information (402), the at least first external navigation resource is utilized to provide the at least first route information to the CP (406). The at least first external navigation resource may communicate directly with the CP (406), or, more typically, communicate with the at least first mobile unit (404), that then transmits the at least first route information to the CP, generally by way of at least a first route information link.

Figure 5:
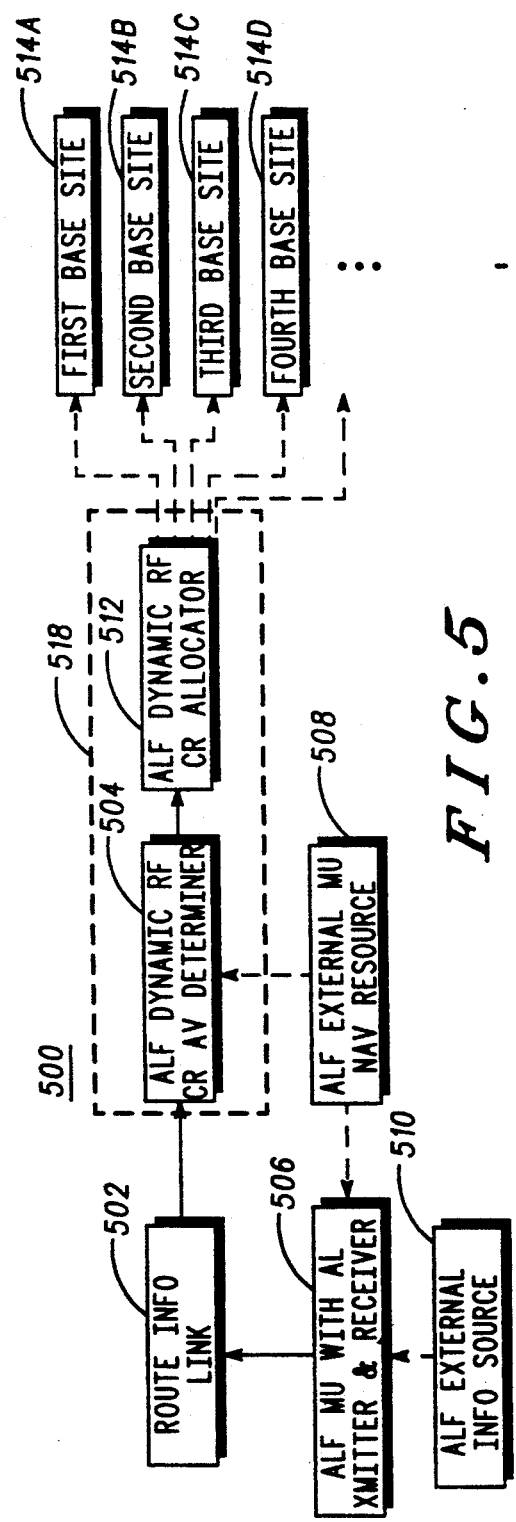
FIG. 5 is a block diagram of one implementation of the present invention in an RF communication system.

FIG. 5, numeral 500, is a block diagram of an RF communication system in accordance with the present invention, allowing efficient provision of RF communication resources, typically comprising at least a first user-traffic voice and/or data channel allocated for continuation of mobile unit communications as a mobile unit changes geographic base site areas, for that mobile unit on a basis of at least one of: dynamic needs and anticipated dynamic needs of at least a first mobile unit. An at least first dynamic RF communication resource determiner (ALF DYNAMIC RF CR DETERMINER)(504) utilizes information from at least one of: at least a first (AL) mobile unit with at least a transmitter and receiver (ALF MU WITH AL XMITTER & RECEIVER) (506) and at least a first external MU navigation resource (508) to determine at least an approximate route of the at least first MU. The ALF MU WITH AL XMITTER & RECEIVER (506) may utilize at least a first external information source (510) as described above. At least a first route information link (ROUTE INFO LINK)(502), typically via a base site, provides that route information to ALF dynamic RF communication resource availability (CR AV) determiner (504) that dynamically determines dynamic and anticipated dynamic needs of at least a first mobile unit and allocates available reserved RF CRs to a selected group of base sites on that dynamic determination. Clearly, that dynamic determination may be effected in numerous manners, some of which are described above. An at least first (ALF) dynamic RF CR allocator (512) provides at least a first reserved RF CR for the at least first mobile unit to continue communication as the mobile unit roves from a first geographic base site area to another geographical base site area not served by the first communication resource. A communication resource is typically at least a first user-traffic voice/data channel allocated for continuation of mobile unit communications as mobile units change geographic base site areas. The RF communication system of the present invention utilizes at least a first CP (518) having at least a first dynamic RF communication resource availability (CR AV) determiner (504), and at least a first dynamic RF CR allocator (512) together with at least a first mobile unit (506) and, if desired, the mobile unit having an external information device (510) and an external mobile unit at least route determining device (508), to provide at least one communication resource for continuing mobile unit communications, as at least a first mobile unit roves, to an at least first base site (514A-D, . . .) on the basis of communication resource availability and dynamic and anticipated dynamic needs of at least a first mobile unit.

It is noteworthy that the present invention provides at least for continuation of mobile unit cellular communication as a mobile unit roves from a geographical area served by a first base site to a geographical area served by a different base site, thus aiding in avoiding forced termination of communications.

I claim:

1. A method for more efficiently providing dynamic RF communication resources for at least a first mobile unit based on dynamic needs and anticipated dynamic needs of the at least first mobile unit, the method comprising at least the steps of:

A) at least a first central processor's obtaining at least first route information of the at least first mobile unit;

B) the central processor's utilizing the at least first route information of the at least first mobile unit to determine at least one of: dynamic and anticipated dynamic RF communication resource needs of the at least first mobile unit; and C) the central processor's dynamically providing at least a first dynamic RF communication resource, where available, to the at least first mobile unit in correspondence with the dynamic RF communication resource availability and the dynamic and the anticipated dynamic mobile unit RF communication resource need determination, wherein the at least first central processor's utilizing the at least the first route information of the at least first mobile unit to determine at least one of: dynamic and anticipated dynamic RF communication resource needs of the at least first mobile unit further includes at least one of:

D) the at least first central processor utilizing the at least first route information to estimate an anticipated dynamic route for the at least first mobile unit;

E) the at least first central processor utilizing the at least first route information provided by an external navigational resource to determine a first dynamic route for the at least first mobile unit; and F) the at least first central processor utilizing at least partial mobile unit dynamic route information to determine a second dynamic route for the at least first mobile unit, where that dynamic route information is provided by the at least first mobile unit; such that the RF communication resource needs of the at least first mobile unit are determined in view of at least one of: that mobile unit's anticipated dynamic route, first dynamic route, and second dynamic route.

2. The method of claim 1, wherein dynamic RF communication resources comprise at least a first user-traffic channel allocated for continuation of mobile unit communications as mobile units change geographic areas.

3. The method of claim 1 wherein the at least first mobile unit utilizes at least a first base site route information link to provide that at least first mobile unit's at least first route information to the central processor.

4. The method of claim 1 wherein the at least first mobile unit utilizes, at least in part, information obtained from an onboard information source to determine the at least first route information of that first mobile unit.

5. The method of claim 1 wherein the at least first mobile unit utilizes, at least in part, information obtained from at least a first external navigational resource to determine the at least first route information of that first mobile unit.

6. The method of claim 5, wherein the at least first external navigational resource is at least one of: a LORAN C device and a global positioning system.

7. The method of claim 1, wherein the at least first mobile unit utilizes, at least in part, information obtained from at least a first external navigational resource to determine the at least first route information of that first mobile unit.

8. The method of claim 7, wherein the at least first mobile unit further provides at least partial dynamic route information obtained from the external navigational resource for that at least first mobile unit to the at least first central processor.

9. The method of claim 1, wherein the at least first mobile unit further provides to the central processor at least partial mobile unit dynamic route information determined onboard for that at least first mobile unit.

10. The method of claim 1, further including the step of determining whether to continue providing at least a first dynamic RF communication resource and one of:
  A) recycling to a central processor's obtaining at least first route information of the at least first mobile unit where continuation is to be provided; and
  B) terminating provision of the at least first dynamic RF communication resource where continuation is not to be provided.

11. A method for more efficiently providing at least a first dynamic RF channel for at least a first mobile unit based on at least dynamic needs and anticipated dynamic needs of the at least first mobile unit, the method comprising at least the steps of:
  A) a central processor's obtaining at least first route information, and where selected, at least partial dynamic route information, of the at least first mobile unit;
  B) the central processor's utilizing the at least first route information and the at least partial dynamic route information, where selected, of the at least first mobile unit to determine at least one of: dynamic and anticipated dynamic RF communication resource needs of the at least first mobile unit employing at least one of the steps B1-B3:
    B1) the at least first central processor utilizing at least the first route information, and where selected, the at least partial dynamic route information, to estimate an anticipated dynamic route for the at least first mobile unit;
    B2) the at least first central processor utilizing at least the first route information provided by an external navigational resource, and where selected, the at least partial dynamic route information, to determine a first dynamic route for the at least first mobile unit; and
    B3) the at least first central processor utilizing at least the first route information determined by the at least first mobile unit utilizing an at least first external information source, and where selected, the at least partial dynamic route information, to determine a second dynamic route for the at least first mobile unit, where that dynamic route information is provided by the at least first mobile unit; such that the RF communication resource needs of the at least first mobile unit are determined in view of at least one of: that mobile unit's anticipated dynamic route, first dynamic route, and second dynamic route; and
  C) the central processor's dynamically providing at least a first dynamic RF communication resource, where available, to the at least first mobile unit in correspondence with dynamic RF communication resource availability and at least one of: dynamic and anticipated dynamic mobile unit RF communication resource need determination based on that mobile unit's anticipated dynamic route, first dynamic route, and second dynamic route.

12. The method of claim 11, wherein dynamic RF communication resources comprise at least a first user-traffic channel allocated for continuation of mobile unit communications as mobile units change geographic areas.

13. The method of claim 11, wherein the at least first external navigational resource is at least one of: a LORAN C device and a global positioning system.

14. The method of claim 11, further including the step of determining whether to continue providing at least a first dynamic RF communication resource and one of:
  A) recycling to a central processor's obtaining at least first route information of the at least first mobile unit where continuation is to be provided; and
  B) terminating provision of the at least first dynamic RF communication resource where continuation is not to be provided.

15. A method for more efficiently providing at least a first dynamic RF channel, allocated for continuation of mobile unit communications as mobile units change geographic areas, for at least a first mobile unit based on at least dynamic needs and anticipated dynamic needs of at least a first mobile unit, the method comprising at least the steps of:
  A) at least a first central processor's obtaining one of:
    A1) at least first route information of the at least first mobile unit, that information being obtained by at least one of A1a-A1c:
      A1a) location-determining means onboard that at least first mobile unit,
      A1b) the at least first mobile unit's utilization of an external information source, and
      A1c) at least a first external navigational resource's determination of the at least first route information of that first mobile unit;
  B) the at least first central processor's being provided at least one of: at least first partial mobile unit dynamic route information obtained from the external navigational resource for that at least first mobile unit, at least second partial mobile unit dynamic route information sufficient to enable the central processor to determine an anticipated dynamic route for that at least first mobile unit wherein the at least first central processor then determines that anticipated dynamic route, and at least partial anticipated dynamic route information provided by the mobile unit describing an anticipated dynamic route for that at least first mobile unit;
  C) the central processor's determining at least one of: dynamic needs and anticipated dynamic needs of the at least first mobile unit in view of at least one of: at least first partial mobile unit dynamic route information, at least second partial mobile unit dynamic route information, and at least partial anticipated mobile unit dynamic route information; and D) the central processor's dynamically providing the at least first RF channel, where available, for the at least first mobile unit in correspondence with dynamic RF channel availability and the at least first mobile unit's dynamic and anticipated dynamic need determination.

16. The method of claim 15, wherein dynamic RF communication resources comprise at least a first user-traffic channel allocated for continuation of mobile unit communications as mobile units change geographic areas.

17. The method of claim 15, wherein the at least first external navigational resource is at least one of: a LORAN C device and a global positioning system.

18. The method of claim 15, further including the step of determining whether to continue providing at least a first dynamic RF communication resource and one of:
   A) recycling to a central processor's obtaining at least first route information of the at least first mobile unit where continuation is to be provided; and
   B) terminating provision of the at least first dynamic RF communication resource where continuation is not to be provided.

19. A dynamic RF communication system, having at least a first central processor and at least a first mobile unit, the mobile unit having at least a first transmitter and at least a first receiver, for more efficiently providing dynamic RF communication resources for at least a mobile unit based on at least dynamic needs and anticipated dynamic needs of the at least first mobile unit, the system comprising at least:
   A) an at least first dynamic RF communication resource availability determining means for determining availability of reserved dynamic RF communication resources and for obtaining at least first route information of the at least first mobile unit;
   B) a first communication resource allocator means of the at least first central processor, responsive to the at least first dynamic RF communication resource availability determining means:
      for utilizing the at least first route information of the at least first mobile unit to determine at least one of: dynamic and anticipated dynamic RF communication resource needs of the at least first mobile unit; and
      for dynamically providing at least a first dynamic RF communication resource, where available, to the at least first mobile unit in correspondence with the dynamic RF communication resource availability and at least the dynamic and the anticipated dynamic mobile unit RF communication resource need determination wherein the at least first mobile unit, responsive to at least one of:
   at least a first external information source;
   at least a first external mobile unit navigational resource; and
   information obtained from an onboard information source of the at least first mobile unit;
such that the mobile unit further transmits at least first route information and partial dynamic route information for that at least first mobile unit to the at least first central processor.

20. The system of claim 19, wherein RF communication resources comprise at least a first user-traffic channel allocated for continuation of mobile unit communications as mobile units change geographic areas.

21. The system of claim 19, wherein, where the at least first mobile unit desires to utilize at least a first dynamically provided RF communication resource, the at least first mobile unit utilizes the at least first mobile unit transmitter to transmit that at least first mobile unit's at least first route information to the central processor.

22. The system of claim 19, wherein the at least first mobile unit utilizes at least a first base site route information link to provide that at least first mobile unit's at least first route information to the central processor.

23. The system of claim 19, wherein the at least first external navigational resource is at least one of: a LORAN C device and a global positioning system.

24. The system of claim 19, wherein at least the first external navigational resource determines the at least first route information, and where selected, at least partial dynamic route information of that first mobile unit and provides that information to the central processor.

25. The system of claim 22, further including an at least first dynamic RF communication resource availability determiner, responsive to the at least first route information link, and, where selected, responsive to the at least the first external mobile unit navigation resource, for utilizing at least the first route information, and where selected, at least partial dynamic route information for that at least first mobile unit, to determine at least dynamic and anticipated dynamic RF communication resource needs of the at least first mobile unit, and for utilizing dynamic RF communication resource availability where:
   A) an anticipated dynamic route for the at least first mobile unit is estimated; and at least one of:
   B) a first dynamic route for the at least first mobile unit where the at least partial dynamic route information is provided by the at least first mobile unit onboard location information; and
   C) a second dynamic route for the at least first mobile unit is provided by the external navigation resource; such that an at least first dynamic RF communication resource allocator, responsive to the at least first dynamic RF communication resource availability determiner, allocates at least a first dynamic RF communication resource, where available, for the at least first mobile unit in view of that mobile unit's anticipated dynamic route and at least one of: the first dynamic route and the second dynamic route.

26. The system of claim 19, further including the at least first dynamic RF communication resource allocator determining whether to continue providing at least a first dynamic RF communication resource and one of:
   A) recycling to obtaining at least first route information of the at least first mobile unit where continuation is to be provided; and
   B) terminating provision of the at least first dynamic RF communication resource for the at least first mobile unit where continuation is not to be provided.

* * * * *